US008312431B1

(12) United States Patent
Moffat et al.

(10) Patent No.: US 8,312,431 B1
(45) Date of Patent: Nov. 13, 2012

(54) SYSTEM AND COMPUTER READABLE MEDIUM FOR VERIFYING ACCESS TO SIGNED ELF OBJECTS

(75) Inventors: Darren J. Moffat, Dublin (IE); Kais Belgaied, Toronto (CA); Paul Sangster, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1629 days.

(21) Appl. No.: 11/230,083

(22) Filed: Sep. 19, 2005

Related U.S. Application Data

(60) Provisional application No. 60/610,851, filed on Sep. 17, 2004.

(51) Int. Cl.
  *G06F 9/44* (2006.01)
  *G06F 7/04* (2006.01)
(52) U.S. Cl. .......................... 717/126; 717/120; 726/27
(58) Field of Classification Search .................. 717/140, 717/174, 177, 120, 126; 713/155, 164, 168, 713/189; 710/200; 726/27
See application file for complete search history.

(56) References Cited

U.S. PATENT DOCUMENTS

| | | | | |
|---|---|---|---|---|
| 4,104,718 A * | 8/1978 | Poublan et al. | ................ | 707/8 |
| 4,868,877 A * | 9/1989 | Fischer | ................ | 713/157 |
| 5,005,200 A * | 4/1991 | Fischer | ................ | 380/30 |
| 5,214,702 A * | 5/1993 | Fischer | ................ | 380/30 |
| 5,276,735 A * | 1/1994 | Boebert et al. | ................ | 713/167 |
| 5,311,591 A * | 5/1994 | Fischer | ................ | 713/156 |
| 5,412,717 A * | 5/1995 | Fischer | ................ | 713/156 |
| 5,412,774 A * | 5/1995 | Agrawal et al. | ................ | 715/804 |
| 5,692,047 A * | 11/1997 | McManis | ................ | 713/167 |
| 5,745,574 A * | 4/1998 | Muftic | ................ | 713/157 |
| 5,825,877 A * | 10/1998 | Dan et al. | ................ | 705/54 |
| 5,933,497 A * | 8/1999 | Beetcher et al. | ................ | 705/59 |
| 5,978,484 A * | 11/1999 | Apperson et al. | ................ | 705/54 |
| 6,085,321 A * | 7/2000 | Gibbs et al. | ................ | 713/170 |
| 6,092,194 A * | 7/2000 | Touboul | ................ | 726/24 |
| 6,249,873 B1 * | 6/2001 | Richard et al. | ................ | 726/4 |
| 6,314,409 B2 * | 11/2001 | Schneck et al. | ................ | 705/54 |
| 6,490,626 B1 * | 12/2002 | Edwards et al. | ................ | 709/229 |
| 6,691,113 B1 * | 2/2004 | Harrison et al. | ................ | 707/10 |
| 6,694,434 B1 * | 2/2004 | McGee et al. | ................ | 713/189 |
| 6,751,735 B1 * | 6/2004 | Schell et al. | ................ | 713/189 |
| 6,795,919 B1 * | 9/2004 | Gibbs et al. | ................ | 713/170 |
| 6,807,633 B1 * | 10/2004 | Pavlik | ................ | 713/170 |
| 6,910,128 B1 * | 6/2005 | Skibbie et al. | ................ | 713/170 |
| 7,024,564 B2 * | 4/2006 | Pavlin et al. | ................ | 713/192 |
| 7,111,285 B2 * | 9/2006 | Smith et al. | ................ | 717/140 |
| 7,188,241 B2 * | 3/2007 | Cronce et al. | ................ | 713/155 |
| 7,360,252 B1 * | 4/2008 | Torrubia-Saez | ................ | 726/27 |
| 7,568,102 B2 * | 7/2009 | Liu et al. | ................ | 713/176 |
| 2001/0056539 A1 * | 12/2001 | Pavlin et al. | ................ | 713/193 |
| 2003/0177394 A1 * | 9/2003 | Dozortsev | ................ | 713/201 |
| 2003/0236986 A1 * | 12/2003 | Cronce et al. | ................ | 713/189 |
| 2004/0015958 A1 * | 1/2004 | Veil et al. | ................ | 717/174 |
| 2004/0083455 A1 * | 4/2004 | Gschwind et al. | ................ | 717/120 |
| 2005/0044544 A1 * | 2/2005 | Slivka et al. | ................ | 717/174 |

(Continued)

*Primary Examiner* — Li B Zhen
*Assistant Examiner* — Hang Pan
(74) *Attorney, Agent, or Firm* — Osha Liang LLP

(57) ABSTRACT

A method for verifying an Executable and Linking File (ELF) object, that includes receiving a request for an ELF object from a client, obtaining the ELF object, determining whether a signature associated with the ELF object is valid, determining whether a usage restriction is associated with the ELF object, if the signature is valid, and restricting access to the ELF object, if the usage restriction is associated with the ELF object.

17 Claims, 6 Drawing Sheets

U.S. PATENT DOCUMENTS

| | | | |
|---|---|---|---|
| 2005/0132357 A1* | 6/2005 | Shell et al. | 717/174 |
| 2005/0183072 A1* | 8/2005 | Horning et al. | 717/140 |
| 2005/0204348 A1* | 9/2005 | Horning et al. | 717/140 |
| 2005/0257209 A1* | 11/2005 | Adams et al. | 717/168 |
| 2005/0278716 A1* | 12/2005 | Koppen et al. | 717/168 |
| 2006/0136889 A1* | 6/2006 | Han et al. | 717/162 |
| 2006/0212854 A1* | 9/2006 | Borges et al. | 717/140 |
| 2006/0212858 A1* | 9/2006 | Kamei et al. | 717/140 |
| 2007/0240136 A1* | 10/2007 | Garyali et al. | 717/140 |
| 2008/0034205 A1* | 2/2008 | Alain et al. | 713/160 |
| 2008/0052705 A1* | 2/2008 | Kaufman et al. | 717/174 |
| 2008/0313460 A1* | 12/2008 | Lotspiech | 713/168 |
| 2009/0055658 A1* | 2/2009 | Hyser | 713/189 |

* cited by examiner

SYSTEM AND COMPUTER READABLE MEDIUM FOR VERIFYING ACCESS TO SIGNED ELF OBJECTS

CROSS-REFERENCE TO RELATED APPLICATIONS

This application claims benefit of U.S. Provisional Application Ser. No. 60/610,851 filed on Sep. 17, 2004, entitled "Signed ELF Objects" in the names of Darren J. Moffat, Kais Belgaied, and Paul J. Sangster.

BACKGROUND

When software programs are shipped overseas or installed at various customer sites, the developers of software programs may implement some security measures to ensure that only the authorized parties access the software programs. This may be implemented, for example, by employing certain access restrictions that are attached to the software. The access restrictions indicate which clients/end users are authorized to access specified portions of a program. When a particular client is identified, the client's credentials may be compared to the access restrictions to determine whether the client is an authorized party capable of accessing the entire program or particular portions of the program.

In some cases, creators and/or distributors of executable software may wish to restrict access to particular portions of software for legal purposes. For example, current United States of America export restrictions on cryptographic products do not allow an open and documented application programming interface (API) that has a pluggable implementation into an encryption framework (i.e., the API cannot be plugged into and taken out of various frameworks). While API developers want to export all the software as one package for multiple types of cryptographic products and multiple cryptographic algorithms, export restrictions require that software for cryptographic products is restricted such that particular consumers (i.e., end users) may access only specific approved cryptographic algorithms.

One approach to restrict users from using functionalities provided in executable files involves cryptography, where data is scrambled, or encrypted, for secure transfer across the network. Cryptography can be employed, for example, using the IPsec (Internet Protocol security) protocol to securely transfer data between computers across the network. Cryptography is also commonly employed using the SSL (Secure Sockets Layer) protocol to encrypt Web-based traffic, such as data sent over e-commerce sites, portals, or secure mail servers.

Conventionally, a common option to restrict software involves closing one end of the framework interface (i.e., either close the end from the end user or the end from the cryptographic providers) and do not include the documentation for the closed interface. However, this does not allow both consumers and providers to have access to the software. Another option is to restrict portions of code provided in the software. In some instances, this option may not be suitable because third parties would not be able to modify the restricted portions or provide additional software algorithms.

SUMMARY

In general, in one aspect, the invention relates to a method for verifying an Executable and Linking File (ELF) object, comprising receiving a request for an ELF object from a client, obtaining the ELF object, determining whether a signature associated with the ELF object is valid, determining whether a usage restriction is associated with the ELF object, if the signature is valid, and restricting access to the ELF object, if the usage restriction is associated with the ELF object.

In general, in one aspect, the invention relates to a system, comprising a client configured to access an Executable and Linking File (ELF) object, the ELF object configured to store executable software, wherein the ELF object is signed using a signature, and a verification daemon configured to verify the signature associated with the ELF object using a certificate associated with the ELF object, wherein the certificate comprises a usage restriction.

In general, in one aspect, the invention relates to a computer system for verifying an Executable and Linking File (ELF) object, comprising a processor, a memory, a storage device, and software instructions stored in the memory for enabling the computer system under control of the processor, to: receive a request for an ELF object from a client, obtain the ELF object, determine whether a signature associated with the ELF object is valid, determine whether a usage restriction is associated with the ELF object, if the signature is valid, and restrict access to the ELF object, if the usage restriction is associated with the ELF object.

In general, in one aspect, the invention relates to a computer readable medium for verifying an Executable and Linking File (ELF) object, comprising software instructions to receive a request for an ELF object from a client, obtain the ELF object, determine whether a signature associated with the ELF object is valid, determine whether a usage restriction is associated with the ELF object, if the signature is valid, and restrict access to the ELF object, if the usage restriction is associated with the ELF object.

Other aspects of the invention will be apparent from the following description and the appended claims.

DETAILED DESCRIPTION

Figure 1:
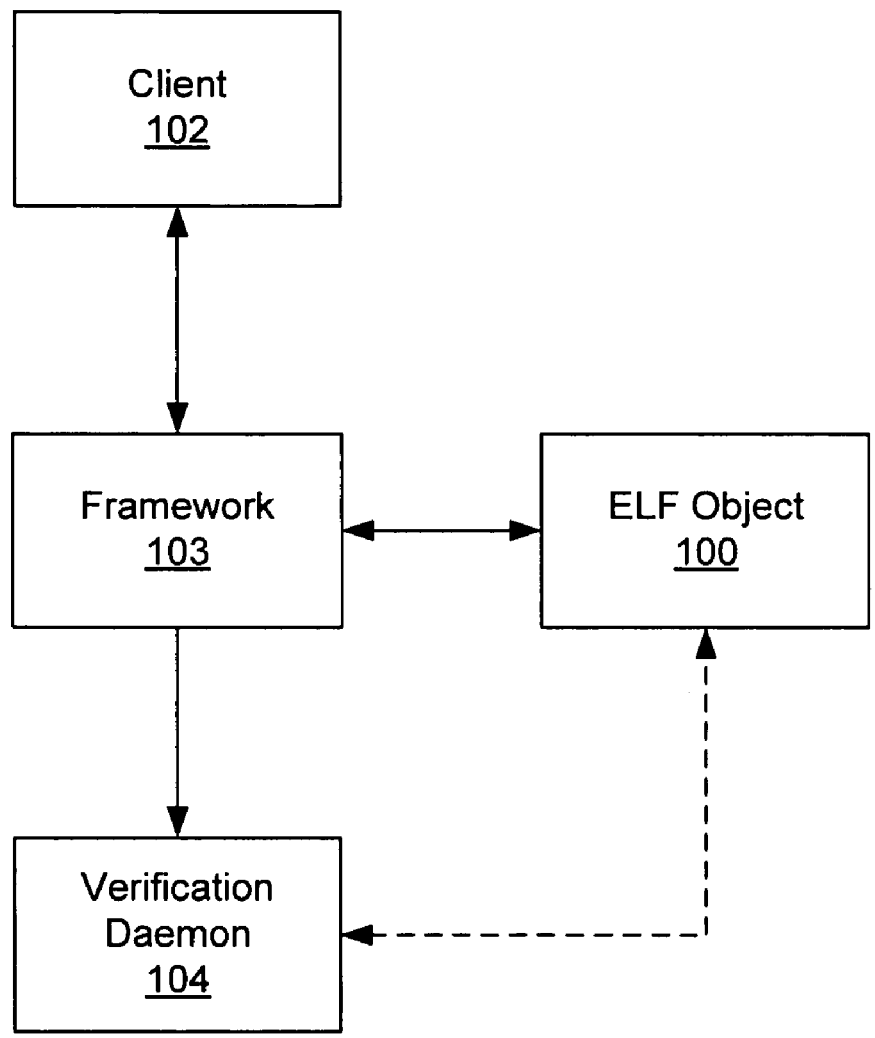
FIG. 1 shows a flow diagram in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to using an Executable and Linking Format (ELF) file to restrict portions of executable software. More specifically, embodiments of the invention relate to signing an ELF object to restrict portions of ELF object. Further, embodiments of the invention relate to verifying the signature within the ELF object and providing usage restrictions to ensure only authorized clients access restricted portions of the ELF object.

FIG. 1 shows a flow diagram for accessing an ELF object in accordance with one embodiment of the invention. Specifically, FIG. 1 shows an ELF object (100), a verification daemon (104), a framework (103), and a client (102). In one embodiment of the invention, the ELF object (100) is a file format configured to store executable software. More specifically, the ELF object (100) is a binary executable file that supplies information necessary for an operating system to create a process image suitable for executing code and accessing the data contained within the ELF object (100). The ELF object is described in more detail in FIG. 2 below.

In one embodiment of the invention, the client (102) may be any consumer capable of using the ELF object (100). Additionally, in one embodiment of the invention, the client (102) may attempt to access the ELF object (100) via a framework (103) configured to load and execute the ELF object (100). Therefore, the framework (103) is responsible for servicing the client's (102) request to access the ELF object (100). In one embodiment of the invention, the framework may be an application or related process. Those skilled in the art will appreciate that a client may employ any framework capable of loading and providing access to ELF objects.

In one embodiment of the invention, the executable software stored in the ELF object (100) may be restricted, for example, due to export control restrictions. Therefore, in one embodiment of the invention, in order to export the entire executable software package, including the framework used to load and provide access to the ELF object (100), the ELF object (100) is digitally signed and the signature is verified using the verification daemon (104). In one embodiment of the invention, the ELF object (100) is signed using a private key known only to signer of the ELF object (100).

The verification daemon (104) is responsible for verifying a given ELF object signature. In one embodiment of the invention, the framework (103) that loads the ELF object (100) when the client (102) requests access to the ELF object (100), calls the verification daemon (104) using a remote procedure call (e.g., Solaris™ door function, Berkley Software Distribution (BSD) sockets, UNIX pipes, etc.). Those skilled in the art will appreciate that other methods of contacting the verification daemon may exist, such as forwarding a request to the verification daemon.

Subsequently, the verification daemon (104) obtains the ELF object (100) and verifies the signature stored in the ELF object (100) using a digital certificate (not shown) associated with the ELF object (100). More specifically, the certificate (not shown) is associated with the signature used to sign the ELF object (100). In one embodiment of the invention, the certificate (not shown) is generated by an appropriate party using a public key associated with the signer of the ELF object (100). In one embodiment of the invention, the certificate (not shown) includes usage restrictions indicating which clients are allowed to access the ELF object (100) (described in FIG. 5 below).

Figure 2:
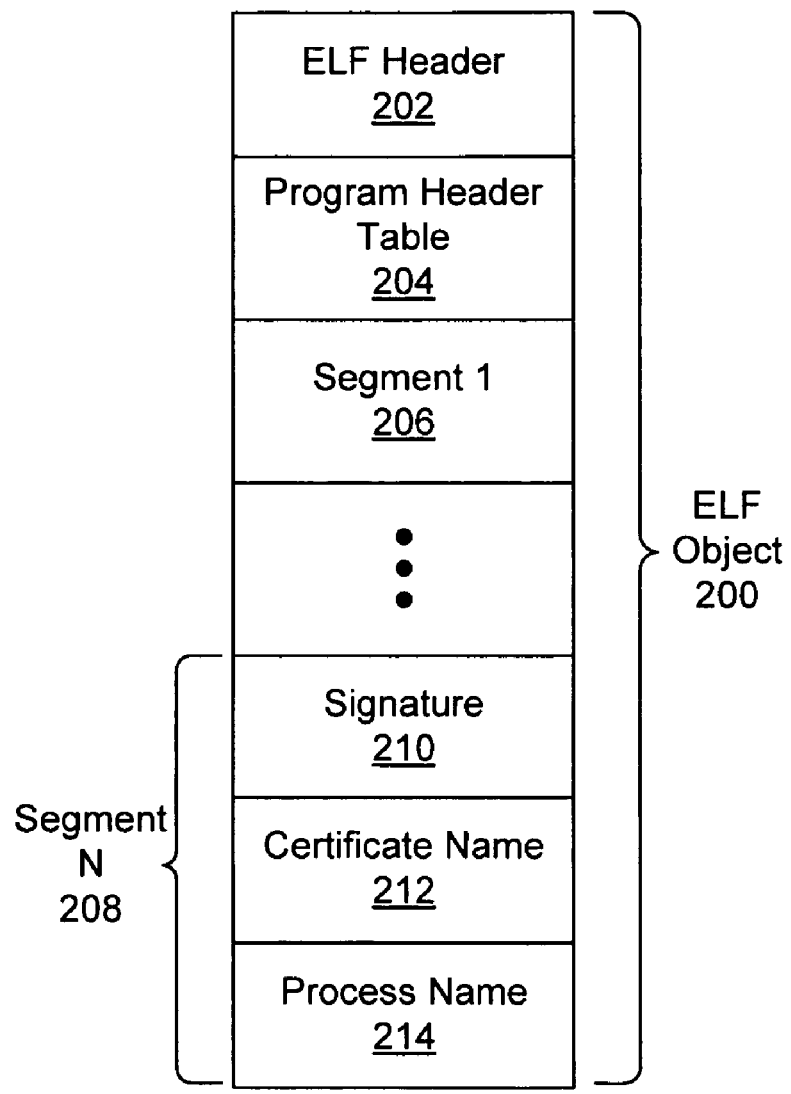
FIG. 2 shows an ELF object in accordance with an embodiment of the invention.

FIG. 2 shows an ELF object in accordance with one embodiment of the invention. The ELF object (200) includes an ELF header (202), a program header table (204), and one or more segments (i.e., Segment 1 (206), Segment N (208)). The ELF header (202) identifies the ELF object (200) and may include information, such as the ELF header size, flags, offsets for the program header table (204) and the section header table, process entry address, file format version, etc. In one embodiment of the invention, the ELF header (202) includes the command used to sign the ELF object. The program header table (204) is an array of entries where each entry is a structure describing a segment in the object file or other information needed to create an executable process image from the ELF object (200). As described above, the size of an entry in the table and the number of entries in the table are given in the ELF header (202). Each entry in the program header table contains the type, file offset, physical address, virtual address, file size, memory image size, and alignment for a segment (e.g., Segment 1 (206), Segment N (208)). Typically, the operating system copies each segment into memory according to the location and size information provided in the program header table (204).

As noted above, each ELF object (200) contains one or more segments (e.g., Segment 1 (206), Segment N (208)). Segments (e.g., Segment 1 (206), Segment N (208)) enable related sections of the ELF object to be grouped together. For example, Segment 1 (206) may be a text segment including groups of executable code, Segment 2 (not shown) may be a data segment including program data, etc. In one embodiment of the invention, the ELF object (200) shown in FIG. 2 includes Segment N (208) which contains the signature (210), certificate name (212), and process name (214). The signature section (210) includes the digital signature used to sign the ELF object (200). In one embodiment of the invention, the signature (210) is a raw signature in RSA Public-Key Cryptography Standards (PKCS) #1 format. Those skilled in the art will appreciate that the signature may be stored in the ELF object using other formats.

In one embodiment of the invention, the certificate name section (212) includes the Distinguished Name (DN) of the certificate. As mentioned above, the certificate corresponds to the signature used to sign the ELF object. Specifically, the certificate includes the public key of the signer of the ELF object and the digital signature of the certificate authority (CA) that issued the certificate. The signature of the CA allows the verification daemon to ensure that the certificate was issued by an appropriate party. Further, the process name section (214) stores the object identifier (OID) of the process (e.g., RSA PKCS #1 algorithm) that is used to sign the ELF object (200). For example, if the digital signature stored in the signature (210) section of the ELF object (200) is signed using the Message Digest (MD) 5 algorithm, then the process name section (214) of the ELF object (200) includes the OID of RSA corresponding to MD5.

Those skilled in the art will appreciate that the signature, certificate name, and process name sections may appear in any segment within the ELF object. In one embodiment of the invention, the ordering of segments is determined by an ELF object library (libELF). Further, those skilled in the art will appreciate that the ELF object may include fields that are not shown in FIG. 2, such as a section header table with information regarding each section within the ELF object, etc.

Figure 3:
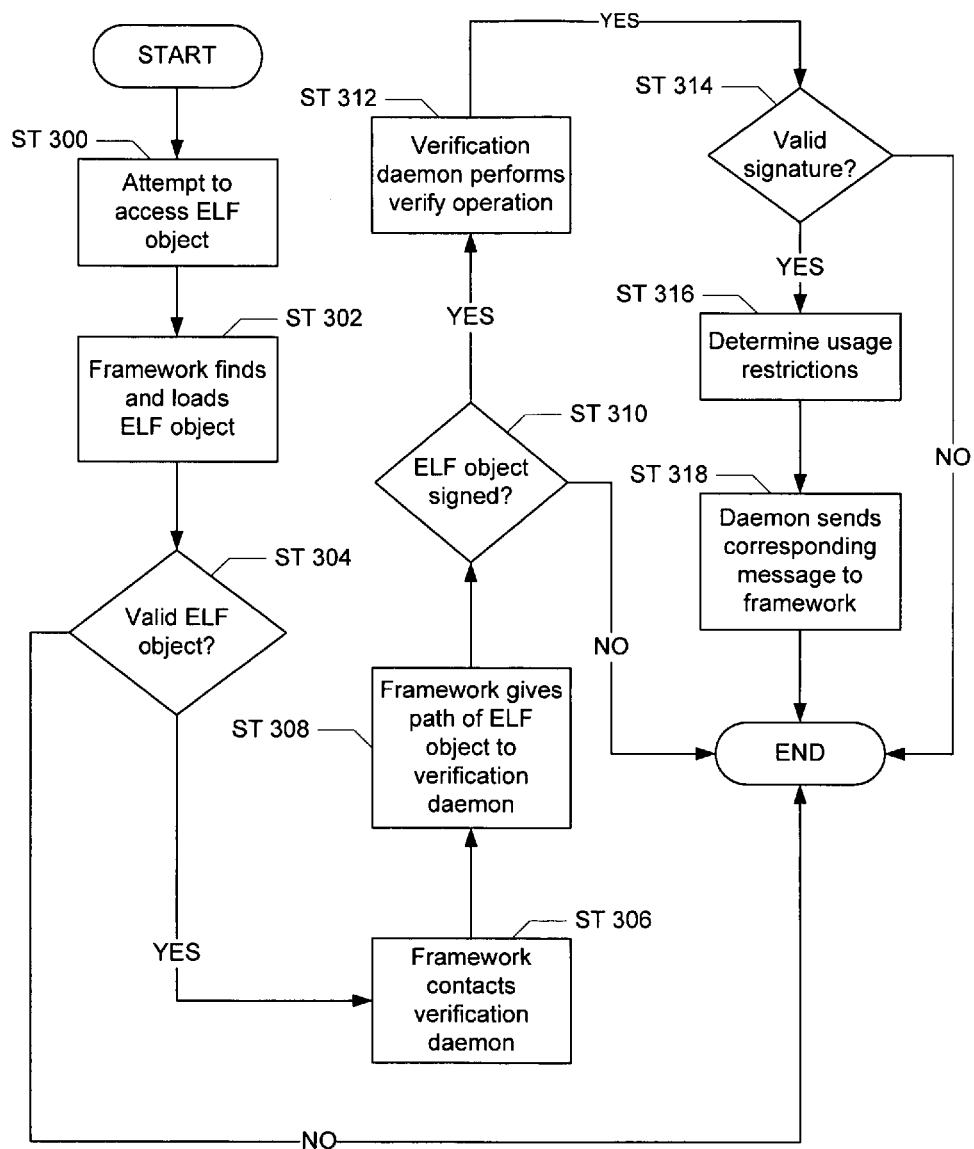
FIGS. 3-5 show flow charts for verifying a signed ELF object in accordance with an embodiment of the invention.

FIG. 3 shows a flow chart for verifying a signed ELF object in accordance with one embodiment of the invention. Before the process shown in FIG. 3 begins, an ELF object is created and digitally signed by a third party. The ELF object is then installed on a client at a customer/consumer site. When a client requests access to the ELF object using a framework configured to service the client's request, the ELF object is verified using the process shown in FIG. 3.

Initially, a client (i.e., consumer) attempts to access an ELF object (Step 300). Subsequently, the framework obtains and loads the ELF object (Step 302). At this point, a determination is made whether the ELF object loaded by the framework is a valid ELF object (Step 304). For example, the framework may check to ensure that the file format of the loaded object is actually an ELF binary file, etc. Further, in one embodiment of the invention, the validation of the ELF object may be implementation specific or caller specific (i.e., specific to the application that attempted to access the ELF object). If the ELF object is not valid, then the process ends. Alternatively, if the ELF object is a valid ELF object, then the framework contacts the verification daemon using any means to contact the verification daemon (e.g., a remote procedure call) (Step 306). The framework then provides the path of the ELF object to the verification daemon so that the verification daemon may retrieve the ELF object (Step 308).

At this stage, a determination is made whether the ELF object is signed (Step 310). In one embodiment of the invention, the verification daemon determines whether a signature exists in one of the sections of the ELF object. Subsequently, the verification daemon performs a verify operation using the signature stored in the ELF object (Step 312) (described in FIG. 4 below). If the result of the verify operation determines that the signature used to sign the ELF object is valid (Step 314), then the framework determines whether any usage restrictions associated with the ELF object exist (Step 316) (described below in FIG. 5). Alternatively, the verify operation performed by the verification daemon may fail, indicating that the signature used to sign the ELF object has been tampered with or is otherwise invalid. In either case, (i.e., whether the signature is successfully or unsuccessfully verified), the verification daemon communicates an appropriate message to the framework (Step 318). Those skilled in the art will appreciate that if the ELF object is not signed, then the framework is notified that the ELF object is usable by all clients.

Figure 4:
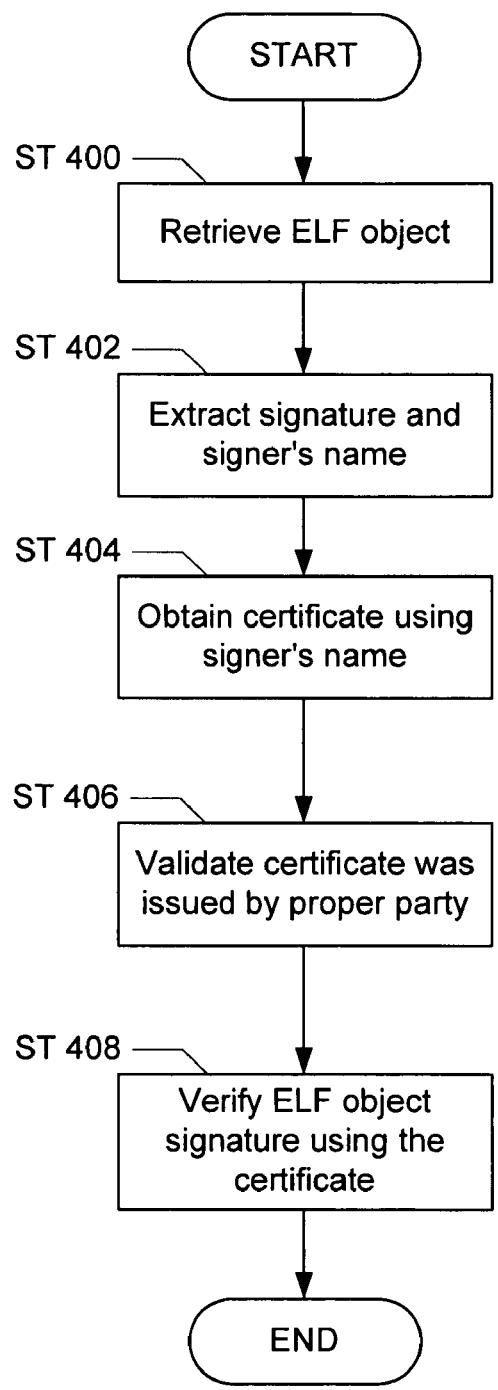

FIG. 4 shows a flow chart for using the verification daemon to verify the signed ELF object in accordance with one embodiment of the invention. Specifically, FIG. 4 shows steps required to perform Step 312 of FIG. 3. Initially, the verification daemon retrieves the ELF object using the path provided by the framework (Step 400). Subsequently, the verification daemon extracts the signature and signer's name from the ELF object (Step 402). The verification daemon subsequently obtains the digital certificate using the signer's name (Step 404). At this stage, the verification daemon validates the certificate (i.e., ensures the certificate was issued by a valid certificate authority) (Step 406). In order to verify this, the verification daemon uses the certificate authority's public key to check the signature on the certificate. Once the certificate is authenticated, the verification daemon verifies the ELF object signature using the certificate (Step 408).

In one embodiment of the invention, in order to verify the signature using the certificate, the verification daemon performs a hash function using the non-signature binary sections (e.g., the sections shown in FIG. 2, except the signature section (210)) of the ELF object. In one embodiment of the invention, the hash function used to generate a hash value is the SHA-1 hash function. Those skilled in the art will appreciate that any appropriate hash function may also be used to hash the binary bits of the ELF object. Subsequently, the verification daemon performs an RSA verify operation using the public key from the certificate and the hash value obtained from the hash function. Those skilled in the art will appreciate that any public key algorithm determined from the signature method data stored in the certificate may be used to perform the verify operation. The result of the verify operation determines whether the signature used to sign the ELF object is a valid signature. The process shown in FIG. 4 performed by the verification daemon prevents unauthorized parties from writing executable software in the ELF object that may be used by the framework.

Figure 5:
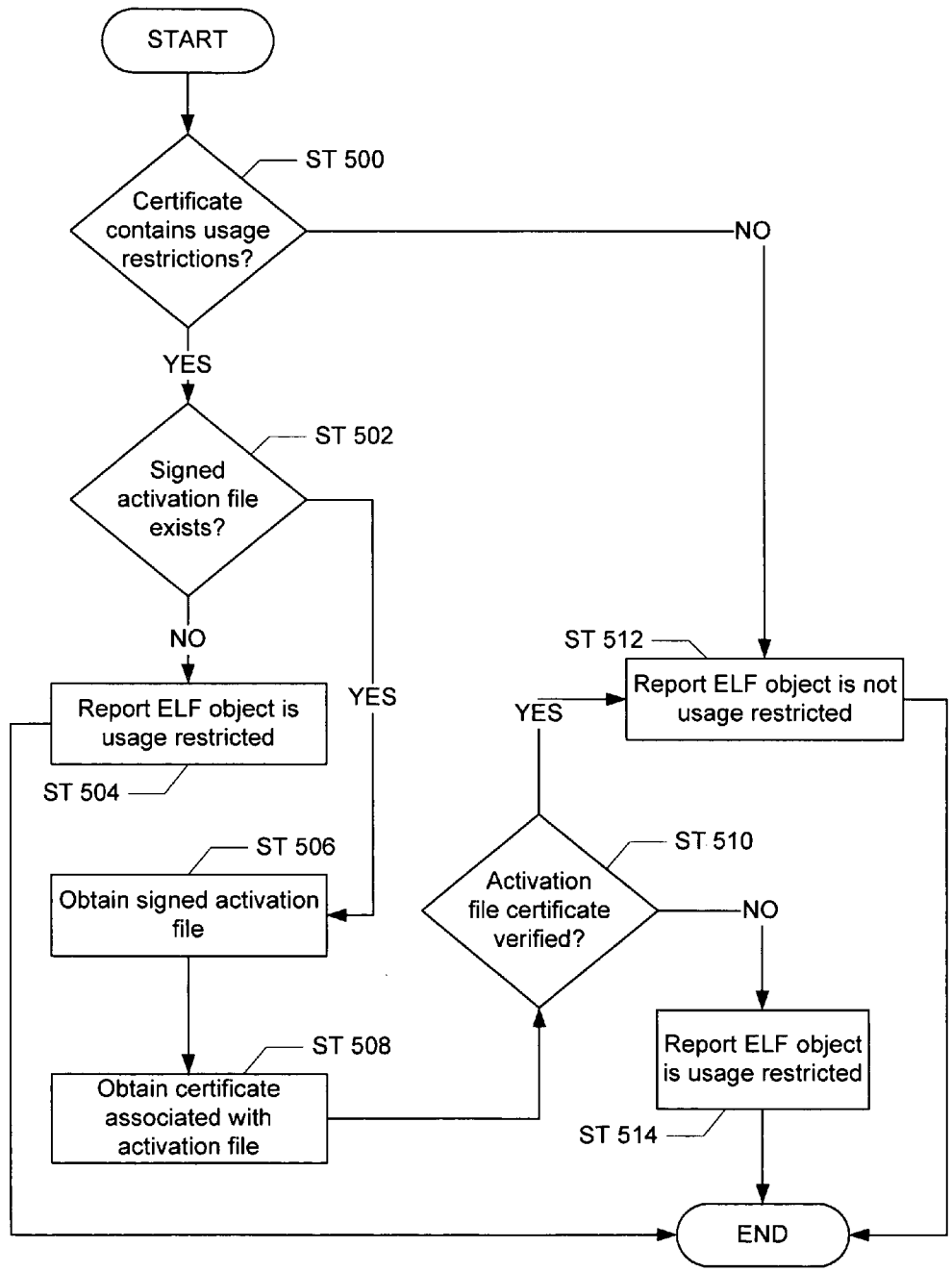

FIG. 5 shows a flow chart for determining usage restrictions associated with the ELF object in accordance with one embodiment of the invention. Specifically, FIG. 5 shows the additional steps required to determine the usage restrictions (Step 316 of FIG. 3) associated with client use of the ELF object. Initially, the certificate associated with the signature used to sign the ELF object is queried to determine whether any usage restrictions are associated with the ELF object (Step 500). In one embodiment of the invention, a usage restriction is cryptographically bound to the signer's certificate. Further, a usage restriction may indicate that the ELF object is usable by all clients, or that the ELF object is limited to a smaller set of allowed clients that may be less export restricted.

Continuing with FIG. 5, if the certificate does not contain any usage restrictions, then the verification daemon reports that the ELF object is not usage restricted and that any client may access the executable software stored in the ELF object (Step 512). In contrast, if the certificate includes usage restrictions associated with the ELF object, then another determination is made as to whether an activation file exists (Step 502).

In one embodiment of the invention, the activation file may be shipped (i.e., exported) to a client site separately from the framework and the ELF object. Specifically, the activation is used to enable a particular ELF object to be used by all clients even if the ELF object is signed with a certificate containing usage restrictions. Therefore, if the activation file is successfully verified, the activation file allows the framework to override the usage restrictions associated with the ELF object. In one embodiment of the invention, the activation file is cryptographically bound to the ELF object.

Returning to FIG. 5, if the activation file does not exist, then the verification daemon reports that the ELF object is usage restricted based on the usage restrictions contained in the certificate. Alternatively, if the activation file exists, then the verification daemon obtains the signed activation file (Step 506). Subsequently, an activation file certificate (associated with the activation file) is obtained using the signer's name of the activation file (Step 508). At this point, a determination is made whether the activation file certificate is valid (Step 510). Specifically, the verification daemon obtains the signer's name and the signature from the activation file. Subsequently, the verification daemon obtains the activation file certificate and checks that the certificate associated with the activation file does not contain any usage restrictions. If the activation file certificate contains usage restrictions, then the ELF object usage restrictions cannot be overridden and the verification daemon reports that the ELF object is usage restricted (Step 514).

Alternatively, if the activation file certificate does not contain usage restrictions, then the activation file's signature is verified using the signer's certificate (i.e., using a similar process as described above with reference to Figure 4). Once the activation file signature is verified, the verification daemon reports that the ELF object is usable by all clients (Step 512). In one embodiment of the invention, the framework is subsequently responsible for enforcing the usage restrictions reported by the verification daemon. Typically, when a client identifies itself to the framework, the framework may use the report from the verification daemon to determine whether that particular client is subject to usage restrictions.

In one embodiment of the invention, a client attempting to access an ELF object may be located in an isolated zone that contains its own operating system, and is separate from any other client or system operating from another zone. More specifically, there may be one global zone (i.e., a default zone) and several non-global zones, where each non-global zone includes clients attempting to access an ELF object. A non-global zone provides an isolated environment for running applications. Processes running in a given non-global zone are prevented from monitoring or interfering with other activities in the system. In this case, each zone may include an individual verification daemon to verify the signed ELF object. In other words, when clients are operating in individual zones, usage restrictions are verified and applied on a per zone basis. In this manner, the usage restrictions verified and applied in one zone (including the global zone) do not apply to clients operating from other zones.

The following examples illustrate the use of signed ELF objects and usage restrictions in accordance with one embodiment of the invention. Consider the scenario in which the framework shown in FIG. 1 is a cryptographic framework configured to load and execute cryptographic providers. A cryptographic provider is configured to store software cryptographic algorithms, such as MD5, 3DES, etc. As noted above, export control laws do not allow an open and documented application programming interface (API) that has a pluggable implementation into a cryptographic framework. In this case, the creator/developer of the framework may employ the use of a signed ELF object in order to export the entire cryptographic framework, including cryptographic providers. Specifically, the cryptographic provider would be an ELF object file format. Further, a client may wish to modify or add cryptographic algorithms to the cryptographic provider. In this case, the addition of new cryptographic algorithms by third parties to the ELF object may require export approval.

Therefore, the creator of the cryptographic provider may sign the cryptographic provider (i.e., the ELF object) and restrict access to particular portions of the cryptographic provider so that the cryptographic provider may be exported to other countries. Subsequently, the processes shown in FIGS. 3-5 are used to verify the signature used to sign the cryptographic provider and determine the usage restrictions associated with the cryptographic provider. For example, consider the scenario where a company has a classification that allows the company to use the cryptographic provider without any usage restrictions. In this case, the cryptographic provider (i.e., in an ELF object format) shipped to the company may be signed by the creator of the ELF object using a private key associated with a certificate marked as enabling use by all clients. Because there is no restriction, the cryptographic provider is signed with no usage restrictions included in the certificate, and no activation file is included.

In contrast, consider the example where a creator of a cryptographic provider wishes to offer unrestricted use by Company X, as well as restricted use for all other clients. In this case, the creator may sign the ELF object with a key associated with a certificate containing a usage restriction, and make the ELF object available to all clients in this manner. When shipping the cryptographic provider and the corresponding cryptographic framework to Company X, which is allowed unrestricted use, the activation file may be included with the cryptographic provider, enabling Company X to employ the activation file to override the usage restrictions and gain unrestricted access to the cryptographic provider.

Figure 6:
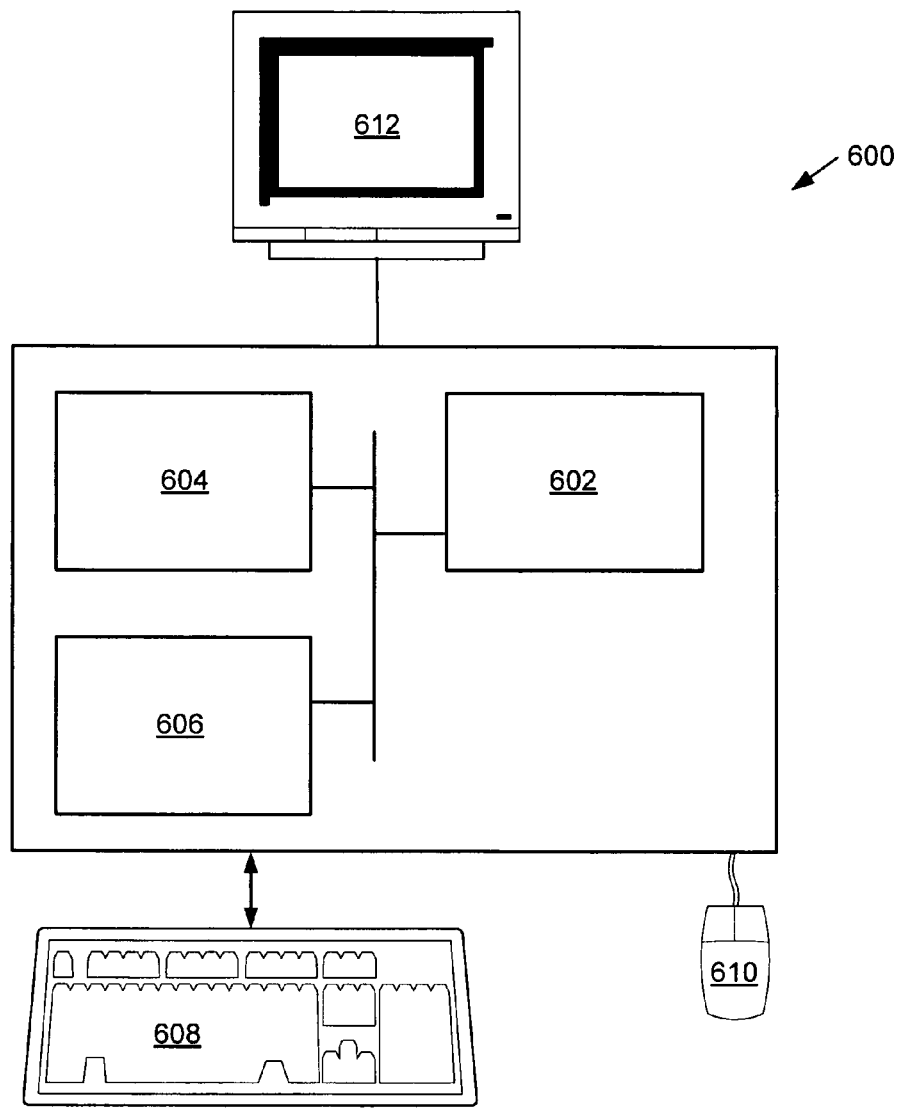
FIG. 6 shows a computer system in accordance with an embodiment of the invention.

Embodiments of the invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a local area network (LAN) or a wide area network via a network interface connection (not shown). Those skilled in the art will appreciate that these input and output means may take other forms. Further, those skilled in the art will appreciate that one or more elements of the aforementioned computer (600) may be located at a remote location and connected to the other elements over a network. Further, software instructions to perform embodiments of the invention may be stored on a computer readable medium such as a compact disc (CD), a diskette, a tape, a file, or any other computer readable storage device.

Embodiments of the invention provide a method to digitally sign an ELF object by adding new sections to the ELF object configured to hold the digital signature and associated verification information. The additional ELF object sections appear such that the sections appear to be like any other module or shared object to an administrator. Further, embodiments of the invention provide a method to override usage restrictions associated with particular clients using an activation file, enabling the entire framework package to be shipped with restrictions, while still allowing particular clients to override the restrictions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system for verifying an Executable and Linking File (ELF) object, comprising:
    a processor; a memory; a storage device; and
    software instructions stored in the memory for enabling the computer system under control of the processor, to:
        receive a request to verify an ELF object from a first client;
        obtain the ELF object from the first client
        extract, from the ELF object, an ELF signature and an ELF signer name associated with the ELF signature;
        obtain, using the ELF signer name, an ELF certificate issued by a certificate authority;
        verify the ELF certificate using a public key associated with the certificate authority;
        determine, using the ELF certificate, that the ELF signature associated with the ELF object is valid;
        determine that the ELF certificate comprises a usage restriction associated with the ELF object;
        obtain a first activation file from the first client;
        extract, from the first activation file, a first activation file signature and a first activation file signer name associated with the first activation file signature;
        obtain an first activation file certificate using the first activation file signer name;
        determine, using the first activation file certificate, that the first activation file signature is not valid;
        instruct the first client to enforce the usage restriction of the ELF object in response to the determination that the first activation file signature is not valid;
        obtain a second activation file from a second client;
        extract, from the second activation file, a second activation file signature and a second activation file signer name associated with the second activation file signature,
        obtain an second activation file certificate using the second activation file signer name;

determine, using the second activation file certificate, that the second activation file signature is valid; and instruct the second client to override the usage restriction of the ELF object using the second activation file in response to the determination that the second activation file signature is valid.

2. The system of claim 1, wherein obtaining the activation file certificate comprises:

verifying the first activation file certificate using the public key associated with the certificate authority.

3. The system of claim 2, wherein the software instructions further enable the computer system to:

report to the client that the ELF object is usage restricted when the first activation file certificate is not valid.

4. The system of claim 1, wherein overriding the usage restriction comprises allowing the second client to execute the ELF object.

5. The system of claim 1, wherein enforcing the usage restriction of the ELF object comprises not allowing the first client to execute the ELF object.

6. The system of claim 1, wherein determining, using the ELF certificate, that the ELF signature associated with, the ELF object is valid comprises:

performing a hash function using at least one non-signature section of the ELF object to obtain a hash value; and performing a verification operation on the hash value using the public key.

7. The system of claim 6, wherein the verification operation is an RSA verify operation.

8. The computer system of claim 1, wherein overriding the usage restriction comprises allowing the second client to access to the ELF object.

9. A non-transitory computer readable medium for verifying an Executable and Linking File (ELF) object, comprising software instructions to:

receive a request to verify an ELF object from a first client;

obtain the ELF object, from the client extract, from the ELF object an ELF signature and an ELF signer name associated with the ELF signature;

obtain, using the ELF signer name, an ELF certificate issued by a certificate authority;

verify the ELF certificate using a public key associated with the certificate authority;

determine, using the ELF certificate, that the signature associated with the ELF object is valid;

determine that the ELF certificate comprises a usage restriction associated with the ELF object;

obtain a first activation file from the first client;

extract, from the first activation file, a first activation file signature and a first activation file signer name associated with the first activation file signature;

obtain an first activation file certificate using the first activation file signer name;

determine, using the first activation file certificate, that the first activation file signature is not valid;

instruct the first client to enforce the usage restriction of the ELF object in response to the determination that the first activation file signature is not valid;

obtain a second activation file from a second client, extract, from the second activation file, a second activation file signature and a second activation file signer name associated with the second activation file signature;

obtain an second activation file certificate using the second activation file signer name;

determine, using the second activation file certificate, that the second activation file signature is valid; and instruct the second client to override the usage restriction of the ELF object using the second activation file in response to the determination that the second activation file signature is valid.

10. The computer readable medium of claim 9, wherein the usage restriction prevents the first client from executing the ELF object.

11. The computer readable medium of claim 9, wherein the ELF object is received from a framework executing on the first client.

12. The computer readable medium of claim 9, wherein the activation file overrides the usage restriction associated with the ELF object, by allowing the second client to execute the ELF object.

13. The computer readable medium of claim 9, wherein the ELF object further comprises:

a distinguished name of the ELF certificate associated with the ELF object; and a name of a process used to sign the ELF object.

14. The computer readable medium of claim 13, wherein the ELF signature is stored in the ELF object in RSA Public-Key Cryptography Standards (PKCS) #1 format.

15. The computer readable medium of claim 13, wherein the process is an RSA Public-Key Cryptography Standards (PKCS) #1 algorithm.

16. The computer readable medium of claim 9, wherein the request is received by the first client using a remote procedure call.

17. The computer readable medium of claim 9, wherein overriding the usage restriction comprises allowing the second client to access to the ELF object.

* * * * *